Oct. 27, 1970   R. B. BEARE ET AL   3,536,412

SINGLE BEARING PUMP

Filed April 17, 1969

INVENTORS
ROBERT B. BEARE
RICHARD L. CONRATH
BY
Kane, Dalimier, Kane, Sullivan + Smith
ATTORNEYS United States Patent Office 3,536,412
Patented Oct. 27, 1970

3,536,412
SINGLE BEARING PUMP
Robert B. Beare and Richard L. Conrath, Herrin, Ill., assignors to Fedders Corporation, Edison, N.J., a corporation of New York
Filed Apr. 17, 1969, Ser. No. 817,036
Int. Cl. F04d 1/00; F04b 21/00; F16c 13/00
U.S. Cl. 415—169
15 Claims

ABSTRACT OF THE DISCLOSURE

A centrifugal fluid pump of low profile design. The pump includes a unitary pulley and shaft assembly, with the inwardly facing surface on the pulley serving as a supporting surface for the shaft bearing. An impeller is mounted at the end of the shaft opposite the pulley. A pump housing surrounds the impeller and includes a downwardly extending cylindrical flange which serves as the opposite supporting surface for the shaft bearing. A sealing arrangement is positioned immediately below the impeller to prevent the fluid in the pump from reaching the shaft.

BACKGROUND AND SUMMARY OF THE INVENTION

This invention relates to a centrifugal pump of the type commonly employed to circulate a fluid. More particularly, the invention relates to a low profile pump of simple and inexpensive design, and which is capable of efficiently circulating water while occupying a minimum space. While the pump as described herein is particularly well adapted for use in an automatic clothes washing machine, it will be appreciated that the pump is also suited for use in many other similar applications.

It is common practice to employ a centrifugal pump in a washing machine to drain the clothes tub after the washing and rinsing operations. A pump of this type normally includes a rotary impeller mounted at one end of a relatively long central shaft. A pulley ring is attached at the opposite end of the shaft, with the pulley ring being rotatably driven by a conventional drive belt arrangement. The shaft is rotatably connected to the fixed pump housing in at least two points along its length to prevent vibration. Conventionally, the shaft is connected across a ball bearing at its lower end with a bushing intermediate the ends. A sealing structure is normally positioned above both the bearing and bushing in an attempt to prevent water from reaching these parts and causing their deterioration. Inevitably however, a small amount of water will leak through the sealing arrangement. To prevent this water from reaching the bushing and bearing, an annular "slinger" ring is often positioned about the shaft to intercept the water. Thus upon rotation of the shaft, water reaching the "slinger" ring will be thrown radially outwardly to a drainage aperture.

It is an object of this invention to provide a pump of the described type having a greatly simplified design. In this regard, it is an object to provide a pump of sufficiently compact design such that the length of the central shaft can be shortened to an extent whereby only a single bearing is required to securely mount the shaft in the housing.

It is a further object of this invention to provide a pump wherein its single bearing is mounted in such a position that it will not come in contact with any water which may leak through the seal. Thus the need for an elaborate sealing structure including the "slinger" ring is eliminated.

Another object is to provide a pump design wherein the pulley ring and central shaft may be fabricated as a unitary structure. This factor, together with the use of only a single bearing, results in a significant savings in cost over pumps of conventional design.

These and other objects and advantages are achieved in the embodiment described herein by the provision of a centrifugal pump comprising a central shaft having an integral pulley ring formed at one end and a rotary impeller mounted at the opposite end. A housing assembly closely surrounds the impeller and includes an inlet duct for admitting a fluid and an outlet duct for discharging the fluid. The housing assembly further includes a mounting portion having a cylindrical flange extending downwardly and coaxially with the shaft to mount a bearing on its outer surface. The outer periphery of the bearing is retained on an inwardly facing cylindrical surface on the pulley ring to provide a rotatable interconnection therebetween. A seal is positioned in the pump at the upper end of the shaft to prevent the fluid from draining downwardly along the shaft. As will be apparent, any fluid which may leak through the seal will travel along the inside surface of the housing flange and will not come in contact with the bearing.

DESCRIPTION OF THE PREFERRED EMBODIMENT

Figure 1:
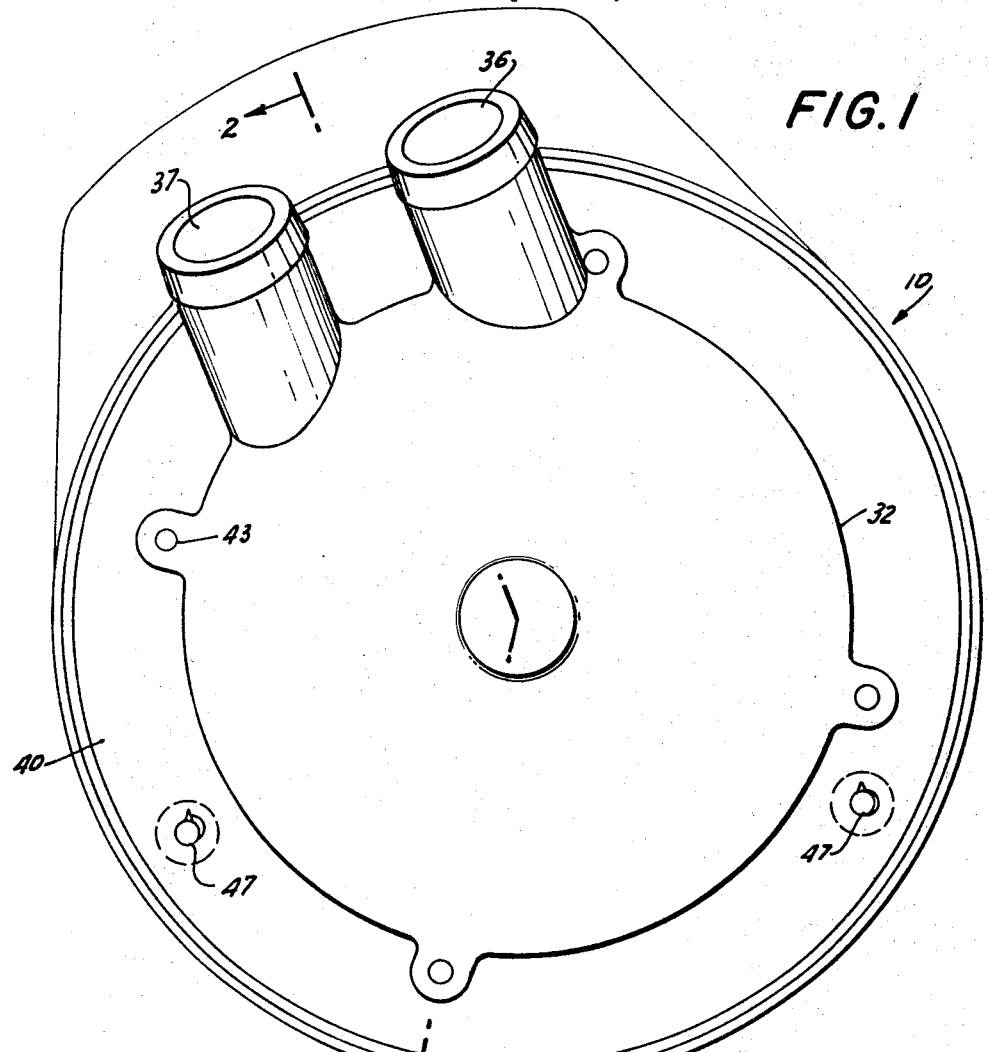
FIG. 1 is an overhead plan view of a pump embodying the features of the present invention.
Figure 2:
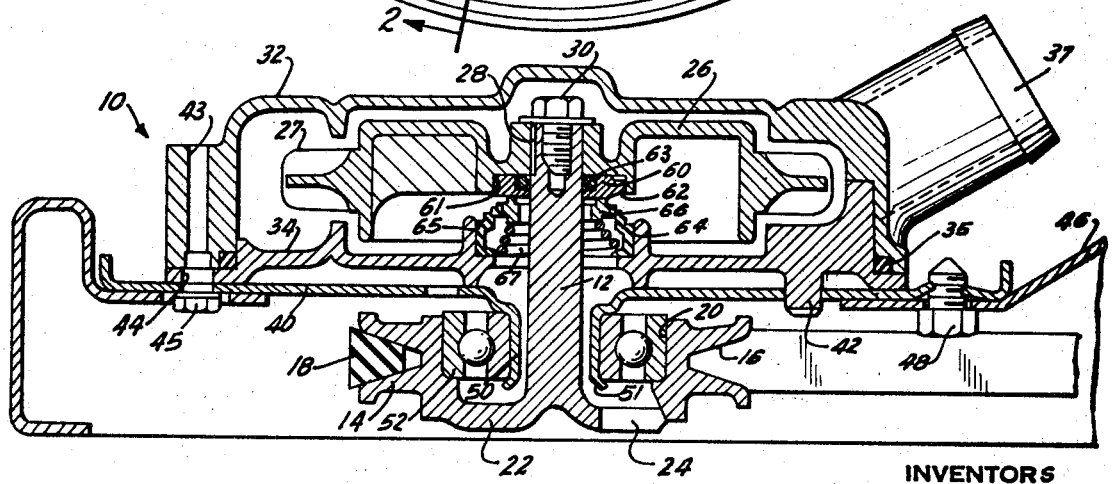
FIG. 2 is a sectional view of the pump taken along the line 2—2 of FIG. 1.

Referring to the drawings, a pump embodying the features of the present invention is illustrated generally at 10. The pump includes a pulley assembly comprising a central shaft 12 and a pulley ring 14. The ring 14 includes a circumferential groove 16 in its outer surface for receiving the drive belt 18, and an inner cylindrical surface 20 coaxial with the shaft 12. The ring 14 is joined to the shaft 12 by an integral annular flange 22 which includes at least one aperture 24 for the purposes hereinafter set forth.

As will be apparent from the drawings, the shaft 12, pulley ring 14, and flange 22 are formed as a one piece, integral unit. While this structure could obviously be formed from a variety of materials, very satisfactory results have been obtained when the assembly is fabricated from a zinc base alloy utilizing a die casting operation.

An impeller 26 is fixedly mounted at the opposite end of the shaft 12. The impeller is of generally conventional design, and includes a number of radial blades 27 on the outer periphery which effect the transfer of water from the inlet duct of the pump to the outlet duct upon rotation of the shaft 12. The impeller may be fabricated from a wide variety of polymeric or other materials. Polypropylene has been found to be very suitably for this purpose since it is light in weight and non corrosive. To prevent relative rotation between the impeller 26 and shaft 12, a splined connection 28 between the two members may be provided. Also, a self-locking screw 30 may be mounted in this end of the shaft to prevent upward movement of the impeller.

The housing assembly of the pump includes a body portion which closely surrounds the impeller and which comprises an upper cover member 32 and a lower base member 34. These two members are joined along their periphery, and an annular sealing gasket 35 of rubber or similar material is interposed therebetween to insure a fluid tight interconnection. The cover 32 includes an inlet port or duct 36 and an exhaust duct 37 leading to the interior of the pump. Thus upon rotation of the belt 18 in a clockwise direction as viewed in FIG. 1, the impeller 26 is rotated to cause the fluid to enter the housing through the inlet duct 36 and be transferred under pressure into and through the exhaust duct 37. It will also be apparent that in view of the interior design of the upper cover member 32, rotation of the shaft in the opposite direction will cause the fluid to reverse its direction of flow through the ducts 36 and 37.

The housing assembly of the pump also includes a mounting plate 40 attached to the body portion in the manner illustrated in the drawings. In particular, the plate 40 is positioned immediately beneath and substantially parallel to the base member 34, and it includes a number of apertures to receive one or more locating studs 42 integrally formed in the base member for this purpose. Also, the cover 32 and base 34 include a number of aligned apertures 43, 44 for receiving the self-tapping screws 45 to maintain the assembly of the housing. The mounting plate 40 is adapted to be secured to the frame 46 of the appliance in any conventional manner such as by employing threaded apertures 47 in the plate and mating bolts 48. The mounting plate also includes a centrally located aperture defined by a downwardly extending cylindrical flange 50.

It will be apparent to those skilled in the art that the various components of the housing assembly may be fabricated from a wide variety of conventional materials. By way of example, it has been found that the cover 32 and base 34 may be molded from a polymeric material such as polypropylene. The use of this material eliminates the danger of rust formation and also reduces the overall weight of the pump. The plate 40 may be fabricated from a metallic sheet material such as 16 gage cold rolled steel, with the flange 50 being formed by a conventional drawing operation.

The outer surface of the cylindrical flange 50 supports a conventional ball bearing 52 which is retained thereon by a flared lip 51 at the end of the flange. The outer periphery of the bearing 52 is retained by a press fit on the cylindrical surface 20 of the pulley ring 14. In this manner, the pulley assembly is caused to be permanently secured to the mounting plate 40 to thereby maintain the assembly of the various components of the pump. It will also be noted from the drawings that the bearing 52 is positioned substantially in the same plane as the drive belt 18. Thus no bending torque is transmitted through the shaft 12, thereby reducing the tendency for vibration.

To prevent the fluid in the pump from coming in contact with the shaft 12, a mechanical face sealing structure is positioned between the lower base 34 and the impeller 26 adjacent the upper end of the shaft. The sealing structure includes a seat 60 which is frictionally or otherwise retained in an annular recess 61 on the impeller. To insure that the seat 60 will rotate with the shaft 12 and impeller 26, a number of radial locking ears 62 may be positioned on the seat to engage corresponding indentations in the recess 61. A resilient O ring 63 is positioned between the seat 60 and impeller to insure a fluid tight interengagement with the shaft 12. A bellows type retainer 64 of rubber or similar material is mounted in an annular recess 65 formed in the base 34, the retainer serving to guide an axial movable sealing washer 66 which engages the bottom surface of the seat 60. A spring 67 is positioned between the base 34 and the sealing washer 66 to insure a fluid tight engagement between the washer and its seat. Upon rotation of the shaft 12, the seat 60 rotates in relation to the washer 66 but the fluid tight engagement is maintained by the axial force of the spring 67. As will be apparent, the washer 66 and its seat 60 may be fabricated from a wide variety of hard, nonporous and non-corrosive materials, such as stainless steel.

Should any fluid leak through the above sealing structure in the pump, it will drain harmlessly down along the shaft 12 and through the aperture 24 in the pulley assembly. Thus it is not possible for the fluid to come in contact with the bearing 52 and thereby cause fouling or rusting of its precision surfaces.

As will be apparent from the above description and drawings, the unique one piece construction of the pulley assembly, as well as the compact mounting arrangement for the bearing 52, permits a substantial reduction in the required overall length of the shaft 12. This factor in turn permits the shaft to be mounted with sufficient stability on a single bearing, thereby contributing to the desired low profile design.

We claim:
1. A centrifugal fluid pump comprising:
   a unitary pulley assembly comprising a central shaft, a pulley ring, and a flange joining said pulley ring to one end of said shaft, said pulley ring having an inwardly facing cylindrical surface coaxial with said shaft,
   a rotary impeller fixedly mounted at the opposite end of said shaft,
   a housing assembly having a body portion surrounding said impeller and including an inlet duct and an exhaust duct, said housing assembly further including a mounting portion defined by a cylindrical flange closely surrounding said shaft beneath said impeller and opposite said inwardly facing cylindrical surface of said pulley ring,
   and a bearing mounted between the outer surface of said cylindrical flange and said inwardly facing cylindrical surface of said pulley ring to permit relative rotation therebetween.
2. The centrifugal fluid pump as defined in claim 1 further comprising sealing means positioned coaxially about said shaft in said housing assembly, said sealing means extending between the undersurface of said impeller and said housing assembly.
3. The centrifugal fluid pump as defined in claim 2 wherein said flange joining said pulley ring to said shaft includes an aperture therein whereby any fluid which may pass through said sealing means drains along the inside surface of said cylindrical flange and through said aperture without coming in contact with said bearing.
4. The centrifugal fluid pump as defined in claim 1 wherein said housing assembly body portion comprises an upper cover member and a lower base member, and said housing assembly mounting portion comprises a plate secured immediately beneath and parallel to said base member.
5. The centrifugal fluid pump as defined in claim 4 wherein said body portion is fabricated from a polymeric material and said plate is fabricated from metal.
6. The centrifugal fluid pump as defined in claim 5 wherein said pulley assembly is of a metallic die cast construction.
7. A low profile centrifugal fluid pump comprising:
   a pulley assembly including a central shaft and pulley ring, said pulley ring being connected at one end of said shaft and including an outer surface having a belt receiving circumferential groove and an inner cylindrical surface coaxial with said shaft,
   a rotary impeller fixedly mounted at the end of said shaft opposite said pulley ring,
   a housing body closely surrounding said impeller and including an inlet duct and an exhaust duct, said housing body being attached to a mounting plate, said mounting plate being positioned intermediate said pulley ring and impeller and including a central aperture defined by a cylindrical flange coaxial with said shaft, the outer surface of said cylindrical flange being in transverse alignment with said inner cylindrical surface of said pulley ring,
   a bearing interposed between the cylindrical flange outer surface and the inner cylindrical surface of said pulley ring to permit relative rotation therebetween,
   and sealing means positioned in said housing body to preclude the fluid in said housing from coming in contact with said shaft, whereby rotation of said pulley ring effects rotation of said impeller to cause the fluid to enter said housing through said inlet duct and be discharged through said exhaust duct.

8. The pump as defined in claim 7 wherein said pulley assembly includes an integral flange connecting said pulley ring and shaft, said integral flange leading from said one end of said shaft to one edge of said pulley ring.

9. The pump as defined in claim 8 wherein said integral flange includes an aperture therethrough, whereby any fluid leaking through said sealing means will drain down the inside of said cylindrical flange on said mounting plate and through said aperture without contacting said bearing.

10. The pump as defined in claim 9 wherein said bearing is positioned in substantially the same plane as that of the said belt receiving circumferential groove.

11. The pump as defined in claim 10 wherein said cylindrical flange on said mounting plate includes a flared lip at the end thereof to retain said bearing.

12. The pump as defined in claim 11 wherein the axial length of said shaft is less than the diameter of said impeller.

13. The pump as defined in claim 12 wherein said housing body comprises a cover and mating base member, said cover and base member being fabricated from a polymeric material.

14. The pump as defined in claim 13 wherein said pulley assembly is of a metallic die cast construction.

15. The pump as defined in claim 14 wherein said mounting plate is fabricated from sheet metal.

References Cited

UNITED STATES PATENTS

| 2,028,360 | 1/1936 | Sprink | 103—111 |
| 2,154,199 | 4/1939 | Colwell et al. | 103—111 |
| 3,382,812 | 5/1968 | Smith | 103—216 |
| 2,184,213 | 12/1939 | Earl | 308—18 |

FOREIGN PATENTS

| 811,849 | 4/1959 | Great Britain. |
| 485,325 | 10/1953 | Italy. |

HENRY F. RADUAZO, Primary Examiner

U.S. Cl. X.R.

415—174, 214; 308—18